Dec. 8, 1925
H. GALLE
1,565,087
TRAVELING OR CHAIN GRATE STOKER
Filed July 10, 1925
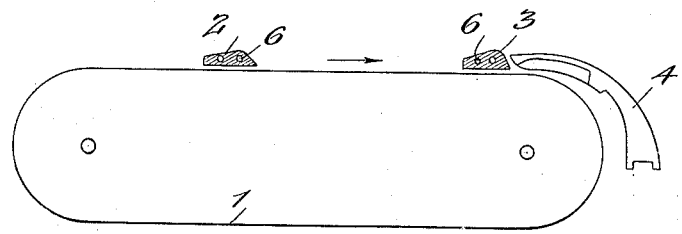
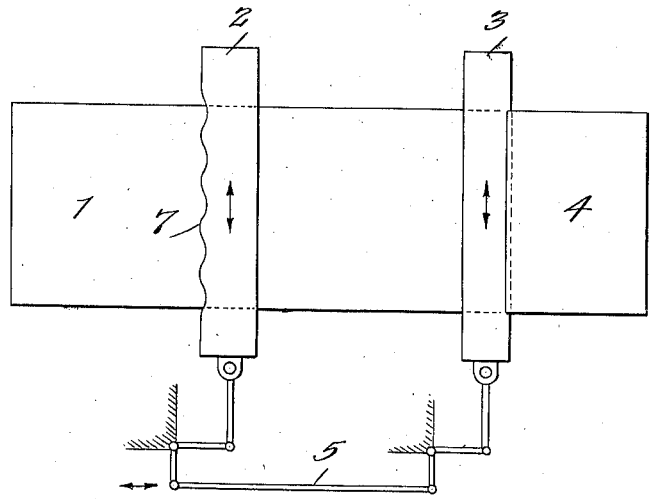
Inventor
SOPHIE GALLE,
EXECUTRIX OF THE ESTATE OF
HUGO GALLE,
By
Attorney Patented Dec. 8, 1925.

1,565,087

UNITED STATES PATENT OFFICE.

HUGO GALLE, DECEASED, LATE OF COESFELD, GERMANY; BY SOPHIE GALLE EXECUTRIX, OF COESFELD, GERMANY.

TRAVELING OR CHAIN GRATE STOKER.

Application filed July 10, 1925. Serial No. 42,842.

*To all whom it may concern:*

Be it known that HUGO GALLE, deceased, late a citizen of the German Republic, residing at Coesfeld, Germany, has invented certain new and useful Improvements in Traveling or Chain-Grate Stokers, of which the following is a specification.

The invention is directed to a breaker bar for use in connection with chain grate stokers. In ordinary traveling stokers a clinker dam is placed at the end thereof to retain the clinkers on the grate appreciably to permit the clinkers to be more or less fully burnt out. As ordinarily provided, this construction results in difficulties largely through the fact that by the retention of the clinkers through the use of the dam such clinkers will unite to form large clinker cakes, which cannot pass the dam and thus bank up and hold back the smaller clinkers from passing.

The present invention aims to overcome this difficulty by providing one or more breaker bars arranged transversely of and in close proximity to the grate with means for oscillating the bars transverse the grate to break up the clinkers and prevent the formation of the large clinker cakes.

The invention is illustrated in the accompanying drawings in which:—

Fig. 1 is a view in elevation showing a traveling grate in outline and the breaker bars in section.

Fig. 2 is a plan of the same, together with a means for operating the breaker bars.

In the drawings 1 represents, diagrammatically a traveling grate on which are arranged breaker bars 2 and 3, the latter being placed immediately in front of the usual clinker dam 4. These bars are arranged in close proximity to the grate and are adapted to be reciprocated transversely of the grate through the medium of lever mechanism, indicated generally at 5, the details of which form no part of the present invention. If desired, the breaker bars may be formed with inner channels 6 through which air or water may circulate to cool the bars and prevent their burning in use.

The bars are shown one toward the front and the other at the rear of the grate and both are constantly reciprocated transversely of the grate. This maintains constant agitation of the fuel, prevents the formation of excess clinkers and increases the capacity of the grate, as the constantly moving fuel permits more lively combustion. If desired, as indicated in Fig. 2 the forward edge of one or both of the breaker bars may be given a serrated or wavy formation, as indicated 7 to facilitate the breaking up and stirring of the clinkers.

I claim:—

1. The combination with a traveling grate of a breaker bar arranged transversely of and in close proximity to the grate and formed and arranged to present a raking edge towards the advancing fuel, and means for reciprocating said breaker bar transversely of the grate.

2. The combination with a traveling grate, of a plurality of breaker bars distributed in spaced parallel relation transversely of and in close proximity to the grate, said bars being arranged and formed to present a raking edge to the advancing fuel, and means for simultaneously reciprocating said bars transversely of the grate.

3. The combination with a traveling grate of a breaker bar arranged transversely of and in close proximity to the grate and formed and arranged to present a raking edge towards the advancing fuel, and means for reciprocating said breaker bar transversely of the grate, said bar being interiorly formed to permit the circulation of a cooling fluid therethrough.

In testimony whereof I affix my signature.

SOPHIE GALLE,
*Executrix of the Estate of Hugo Galle, Deceased.*